United States Patent [19]

Zucker et al.

[11] 4,357,436

[45] Nov. 2, 1982

[54] COMPOSITE INSULATING MATERIAL AND PROCESS

[75] Inventors: Jerry Zucker, Charleston; Carl E. Chivers, Hanahan; Donald E. Jefferson, Summerville, all of S.C.

[73] Assignee: RM Industrial Products Company, Inc., North Charleston, S.C.

[21] Appl. No.: 155,583

[22] Filed: Jun. 2, 1980

[51] Int. Cl.$^3$ ............................................. C08K 7/04
[52] U.S. Cl. .................................. 524/448; 524/449; 524/450; 524/506
[58] Field of Search ................ 260/42.26, 37 SB; 525/105; 524/448, 449, 450, 506

[56] References Cited

U.S. PATENT DOCUMENTS

| | | | |
|---|---|---|---|
| 2,884,388 | 4/1959 | Hedlund | 260/42.26 |
| 3,021,292 | 2/1962 | Hurd et al. | 260/42.26 |
| 3,121,069 | 2/1964 | Dietz | 260/42.26 |
| 3,715,411 | 2/1973 | Day et al. | 525/105 |
| 4,031,059 | 6/1977 | Strauss | 260/37 SB |
| 4,041,010 | 8/1977 | Jeram | 260/37 SB |
| 4,104,322 | 8/1978 | Snavely | 525/105 |
| 4,234,702 | 11/1980 | Nakamura | 525/105 |
| 4,265,801 | 5/1981 | Moody et al. | 524/506 |

*Primary Examiner*—Lewis T. Jacobs
*Attorney, Agent, or Firm*—Gary, Juettner & Pyle

[57] ABSTRACT

A heat curable material in the form of a moldable and extrudable paste comprises a mixture of inorganic fibers, an elastomer, silicone resin and various optional fillers, all mixed with a suitable solvent. The material cures into a durable solid having excellent physical properties and superior thermal insulating characteristics.

12 Claims, No Drawings

COMPOSITE INSULATING MATERIAL AND PROCESS

BACKGROUND OF THE INVENTION

There is a great and ever increasing need for shaped materials having good heat insulating properties while possessing sufficient durability and strength at variable temperatures including elevated temperatures. Historically, asbestos fiber has been used in many of such products because of the excellent high temperature properties of asbestos and the relative easy ability to combine the asbestos with other materials, such as wire, elastomers and other polymers. More recently, a demand has arisen for insulating materials that are free or substantially free of asbestos, especially due to the health problems associated with asbestos dust.

Unfortunately, equal replacements for asbestos have not appeared in industry. Glass fibers do not withstand applications involving high temperatures. Ceramic fibers possess good high temperature performance but are difficult to handle and have been used primarily in bulk form.

U.S. Pat. No. 3,395,071 describes the preparation of composite sheets containing asbestos and silicone resins. U.S. Pat. No. 3,835,054 and the reference mentioned therein discuss the use of ceramic fibers to make thermal insulation board.

SUMMARY OF THE INVENTION

The present invention provides a thermal insulating product made from a formable paste containing ceramic and other inorganic fibers, elastomer, silicone resin and optional fillers, together with sufficient solvent to render the mixture moldable or formable in a particular operation. After forming into the desired shape, the material is heat cured into the form of a non-porous solid having unexpectedly superior thermal insulating properties. The formable, yet shape-retaining nature of the uncured mixture allows an extremely wide variety of products to be made in an economical fashion without experiencing problems associated with the handling of ceramic fibers.

DESCRIPTION OF THE PREFERRED EMBODIMENTS

The present invention involves the use of at least partially dissolved elastomer and silicone resin to form a binder matrix for inorganic fibers and other solid fillers. The amount of solvent used is sufficient for the mixture to have a paste-like consistency that can be formed by means of molding, extrusion, sheeting or otherwise into the desired shape and/or thickness, whereupon the shaped mass is heat cured to form a solid, as will be fully explained herein.

The final product, after evaporation of the solvent, generally comprises from about 25 to about 65 percent inorganic fiber, of which at least a majority is ceramic fiber, from about 5 to about 40 percent elastomer, from about 2.5 to about 35 percent silicone resin, and from zero to about 55 percent solid fillers.

The composition herein described may be free from asbestos if desired, and preferably a majority of the inorganic fiber content are ceramic fibers, i.e., polycrystalline metal oxide fibers, having a high melt temperature typically in excess of 3,000° F. Such fibers are composed of aluminum oxide or calcium oxide and silica, as well as minor amounts of other metal oxides such as iron, titanium and magnesium. Ceramic fibers of various types are available commercially, and are sold under the trade names "Cerafiber", "Fiberfax", "Kaowool" and others. Other fibers that are suitable alone in admixture with the ceramic fibers are asbestos fibers, various types of glass fibers, either modified or unmodified, carbon fibers and the like.

The type of rubber or elastomer employed is not critical, provided that the elastomer may be partially dissolved in the solvent being used and has the proper viscosity and/or flow characteristics to be handled. Especially preferred are styrenebutadiene rubbers and neoprenes, although others such as butyl rubber, polybutadiene, nitriles, silicones and fluorocarbons, as well as mixtures thereof, may be employed. Various other elastic polymers are also suitable, including, for example, styrene and urethane resins as well as polyethylene oxide.

In some applications, especially where rapid or partial curing of the elastomer is desired during processing, conventional accelerators may be incorporated into the elastomer. For example, if the solvented material is formed into a sheet by building up a mass on a rotating drum, it would be advisable to have the material partially cured so that the sheet would be shape retaining when removed from the drum.

The elastomer appears to serve at least dual functions in the composition. Prior to being cured, the elastomer provides necessary cohesiveness to bind the solid ingredients in a uniform mixture and allows the material to be shaped as desired. After the material is cured, and particularly upon exposure of the material to high temperatures, it is believed that the rubber at least partially decomposes or degrades, although the remaining components from the degraded elastomer provide some of the structure and integrity in the final product.

The silicone resin used in the present composition is any of a number of commercially available resins, which are essentially a three dimensional branched chain made from a blend of chlorsilanes containing di- and tri-functional monomers or mixtures thereof. As a non-fully equivalent alternative, silicone rubber may replace all or a part of the silicone resin. The purpose of the resin in the mixture is principally to serve as a solid binder for the mixture upon curing. Particularly at elevated temperatures, a portion of the resin near the surfaces of the body may decompose into silicates, thus further increasing the insulating value and rendering the surface more resistant to heat and oxidation.

In addition to the foregoing components, it is usually desirable to incorporate solid fillers or mixtures thereof into the composition, said fillers usually being added in particulate, granular or powdered form so as to more evenly mix with the other components and provide additional structure and body. In some instances, the particular choice of fillers will depend on the properties desired in the final article. Particularly suitable fillers include titanium oxide and mica and mixtures thereof. Other useful fillers include barium sulfate, calcium sulfate, calcium silicate, aluminum silicate, magnesium oxide, vermiculite, diatomaccous silicia, glass microspheres graphite and polytetrafluoroethylene. The latter two components would be beneficially included in the making packings, such as valve stem packings, where a certain degree of lubricity is desirable.

As mentioned previously, the various components of the insulating material are first mixed with sufficient solvent until the mixture has a paste-like consistency. Depending upon the elastomer employed, suitable solvents would include toluene, naptha, benzene, methylene chloride and the like. Typically, the initial mixture, having the desired consistency will contain from about 40 to about 60 percent solvent based on the weight of the other materials.

In preparing the paste, the elastomer is first mixed with sufficient solvent to dissolve the rubber. Typically, about 10 to about 25 percent of the mixture will comprise rubber. The inorganic fiber is then added and mixed until a substantially uniform mixture is obtained. The resin, together with additional fillers are added and mixing is continued. After a substantially uniform mixture is obtained, other materials, such as chopped fiberglass may be incorporated into the mixture. The chopped fiberglass is especially suitable as a reinforcing material.

The ratio of the amount of rubber to silicone in the binder and the amount of total fiber to total binder in the mixture may vary substantially, depending on the method to be used to form the paste. Generally, optimum results will be obtained by using from about 0.5 to about 8 parts rubber to one part silicone, and from 1.25 to about 2.50 total fiber to one part total binder.

Upon completion of mixing, the mixture will be substantially smooth and paste-like and thereupon may be formed into any desired shape, such as sheets, strips, tubes, cylinders or more complex forms. An important advantage of the present invention is that the uncured material is formable, by conventional methods, such as sheeting, extrusion, molding, and the like, into virtually any size, shape or pattern and may be easily cut, curved or folded, depending upon the final desired form of the product.

The shaped material is then cured by the application of heat. Preferably, the temperature of the material is gradually increased over a period of time until the solvent is evaporated and the rubber and resin are cured. The time and temperatures required will depend on the thickness and shape of the article. Typically, oven temperatures may be increased from below 200° F. to 500° F. or higher for a period of from about one to six hours to effect the cure. The optimum curing conditions will be easily determined by those skilled in the art. In some cases, where a degree of flexibility is required in the product, the mixture may be only partially cured.

The final cured product, comprising a matrix of the fiber and fillers in the rubber and silicone binder, will have a density in the order of about 30 to about 50 pounds per cubic foot and will have thermal properties that are superior to other comparable products, including those containing large amounts of asbestos, as will become evident from the following examples.

EXAMPLE I

The following compositions (percentages by weight) were prepared by mixing in a Sigma blade mixer:

|  | 1 | 2 | 3 |
|---|---|---|---|
| Ceramic Fiber ("Kaowool") | 33.86 | 21.58 | 18.9 |
| SBR Rubber | 8.89 | — | 9.67 |
| Neoprene Rubber | — | 8.04 | — |
| Silicone Resin (DC-4-4136) | 10.87 | 6.93 | 3.44 |
| Titanium Dioxide | 5.59 | 3.56 | 3.12 |
| 3X Mica | 5.59 | 3.56 | 3.12 |
| Fiberglass | — | 6.47 | 5.67 |
| Tolulene | 35.21 | 49.85 | 56.08 |

After thorough mixing, each of the above compositions had a paste-like consistency and were extruded into sheets. The sheets were then cured in an oven at temperatures commencing at 210° F. and ending at 450° F. over a period of four hours.

EXAMPLE II

Sheet materials from the following compositions (percentages by weight) were prepared in accordance with the method of Example I.

|  | 1 | 2 | 3 |
|---|---|---|---|
| Ceramic Fiber ("Kaowool") | 21.26 | 18.56 | 16.53 |
| SBR Rubber | 7.89 | 6.92 | 6.16 |
| Silicone Resin (DC-4-43136) | 6.81 | 5.96 | 5.31 |
| Expanded Vermiculite | 6.99 | — | — |
| Diatomaceous Silica | — | 12.25 | — |
| Microbubbles | — | — | 10.91 |
| Titanium dioxide | — | — | 2.73 |
| Mica | — | — | 2.72 |
| Fiberglass | 6.38 | 5.57 | 4.96 |
| Tolulene | 50.65 | 50.74 | 50.68 |

In evaluating the foregoing samples and other samples having different compositions, an important property exhibited by the product is its extremely low thermal conductivity. At mean temperatures ranging from 200° F. to 900° F., the thermal conductivity is essentially linear and extends from about 0.06 to about 0.09 (BTU/Ft$^2$Hr°F./Ft). Thus, at temperatures below about 900° F., the thermal conductivity is less than 0.10. In comparison, asbestos sheeting over the same temperature range has a thermal conductivity in the order of 0.09 to 0.14.

To further demonstrate the insulating value, the temperature drop across a one-eighth inch sheet of a typical material of this invention was measured at various temperatures and is summarized below.

| Temperature (°F.) at one side of sheet | Temperature (°F.) drop across sheet |
|---|---|
| 600 | 366 |
| 800 | 503 |
| 1000 | 635 |
| 1500 | 1040 |

The product of the present invention is particularly useful as a heat shielding material, for example, exhaust and engine compartment insulation barriers in transportation vehicles, boiler applications, home and industrial appliances, as well as many others, such as a packing material or gaskets.

We claim:

1. A thermal insulating material comprising a mixture of heat-resistant solids and a curable binder system, said heat-resistant solids comprising, of the total weight of the mixture, from about 25 to about 65 percent inorganic fibers and from zero to about 55 percent solid particulate fillers, said binder comprising, of the total weight of the mixture, from about 5 to 40 percent elastomer, said elastomer serving as a binder for said solids prior to the curing of said binder system, and from about 2.5 to about 35 percent silicone resin, said resin serving as a binder for said solids after curing of said binder system.

2. The material of claim 1 wherein said material is in admixture with a solvent for said elastomer and silicone resin and the mixture has a paste-like consistency.

3. The material of claim 1 wherein the elastomer and silicone resin are at least partially cured and said material is a substantially solid body.

4. The material of claim 1 wherein the elastomer and silicone resin are cured and said material is a solid body, and wherein said elastomer and resin are partially thermally degraded.

5. The material of claim 1 wherein the majority of said inorganic fiber is ceramic fiber.

6. The material of claim 1 wherein said inorganic fiber comprises ceramic fiber and glass fiber.

7. The material of claim 1 wherein the elastomer comprises styrene-butadiene rubber.

8. The material of claim 1 wherein the solid particulate fillers comprise titanium dioxide and mica.

9. The material of claim 1 wherein the thermal conductivity of said material is less than 0.1 $BTU/Ft^2Hr°F./Ft$ at temperatures below 900° F.

10. The material of claim 1 wherein the solid particulate fillers comprise vermiculite.

11. The material of claim 1 wherein the solid particulate fillers comprise microspheres.

12. The material of claim 1 where the solid particulate fillers comprise diatomaceous silica.

* * * * *